(12) United States Patent
Blackburn

(10) Patent No.: US 7,537,240 B2
(45) Date of Patent: May 26, 2009

(54) GAS GENERATING SYSTEM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 254 days.

(21) Appl. No.: 11/358,786

(22) Filed: Feb. 21, 2006

(65) Prior Publication Data

US 2006/0261584 A1 Nov. 23, 2006

Related U.S. Application Data

(60) Provisional application No. 60/655,061, filed on Feb. 22, 2005.

(51) Int. Cl.
*B60R 21/26* (2006.01)
(52) U.S. Cl. ........................................... 280/741
(58) Field of Classification Search ............... 280/741, 280/740, 736
See application file for complete search history.

(56) References Cited

U.S. PATENT DOCUMENTS

| | | | |
|---|---|---|---|
| 1,939,700 A | 12/1933 | Hofstetter | 89/14.2 |
| 2,891,525 A | 6/1959 | Moore | 123/90.51 |
| 2,959,127 A | 11/1960 | Weinert | 102/368 |
| 3,794,347 A | 2/1974 | Zens | 280/150 |
| 3,877,882 A | 4/1975 | Lette et al. | |
| 3,880,447 A | 4/1975 | Thorn et al. | |
| 3,958,949 A | 5/1976 | Plantif et al. | |
| 3,985,076 A | 10/1976 | Schneiter et al. | |
| 4,001,750 A | 1/1977 | Scherer et al. | 337/280 |

(Continued)

FOREIGN PATENT DOCUMENTS

DE 40 19 877 A1 6/1990

(Continued)

OTHER PUBLICATIONS

U.S. Appl. No. 11/251,255.

(Continued)

*Primary Examiner*—Faye M. Fleming
(74) *Attorney, Agent, or Firm*—L.C. Begin & Associates, PLLC.

(57) ABSTRACT

A gas generating system (10) is provided including a housing (12) with a longitudinal axis (A), and a first baffle tube (22*a*) positioned within the housing (12) and having a pair of opposed ends. A second baffle tube (24*a*) is also positioned within the housing (12) and has a pair of opposed ends. A first pair of opposed surfaces (59*a*, 60*a*) is formed within the housing (12). Each of the first pair of opposed surfaces (59*a*, 60*a*) is sloped with respect to the longitudinal axis (A) and abuts a corresponding end of the first baffle tube (22*a*) to position the first baffle tube (22*a*) within the housing (12) such that a longitudinal axis of the first baffle tube (22*a*) is substantially coaxial with the longitudinal axis (A) of the housing (12). Each of the first pair of opposed surfaces (59*a*, 60*a*) also abuts a corresponding end of the second baffle tube (24*a*) to position the second baffle tube (24*a*) within the housing (12) such that a longitudinal axis of the second baffle tube (24*a*) is substantially coaxial with the longitudinal axis (A) of the housing (12). A vehicle occupant protection system (180) including the gas generating system (10) is also disclosed.

5 Claims, 2 Drawing Sheets

U.S. PATENT DOCUMENTS

| | | | | |
|---|---|---|---|---|
| 4,012,189 | A | 3/1977 | Vogt et al. | 431/353 |
| 4,215,631 | A | 8/1980 | Rucker | 102/27 |
| 4,530,516 | A | 7/1985 | Adams et al. | 280/741 |
| 4,588,043 | A | 5/1986 | Finn | 181/223 |
| 4,611,374 | A | 9/1986 | Schnelle et al. | 29/890.13 |
| 4,722,551 | A | 2/1988 | Adams | |
| 4,730,558 | A | 3/1988 | Florin et al. | 102/218 |
| 4,762,067 | A | 8/1988 | Barker et al. | 102/313 |
| 4,886,293 | A | 12/1989 | Weiler et al. | |
| 4,950,458 | A | 8/1990 | Cunningham | 422/164 |
| 5,028,070 | A | 7/1991 | Bender | |
| 5,048,862 | A | 9/1991 | Bender et al. | |
| 5,100,171 | A | 3/1992 | Faigle et al. | 280/736 |
| 5,215,721 | A | 6/1993 | Tasaki et al. | |
| 5,294,244 | A | 3/1994 | Allerton, III et al. | 75/401 |
| 5,318,323 | A | 6/1994 | Pietz | |
| 5,333,656 | A | 8/1994 | Mackal | 141/330 |
| 5,340,150 | A | 8/1994 | Harada et al. | |
| 5,372,449 | A | 12/1994 | Bauer et al. | 403/273 |
| 5,387,009 | A | 2/1995 | Lauritzen et al. | |
| 5,406,889 | A | 4/1995 | Letendre et al. | |
| 5,443,286 | A | 8/1995 | Cunningham et al. | |
| 5,466,420 | A | 11/1995 | Parker et al. | |
| 5,509,686 | A | 4/1996 | Shepherd et al. | 280/738 |
| 5,516,147 | A | 5/1996 | Clark et al. | 280/737 |
| 5,533,751 | A | 7/1996 | Kort et al. | 280/737 |
| 5,556,439 | A | 9/1996 | Rink et al. | 55/487 |
| 5,562,304 | A | 10/1996 | Gest | |
| 5,564,743 | A | 10/1996 | Marchant | 280/741 |
| 5,582,427 | A | 12/1996 | Rink et al. | 280/740 |
| 5,588,676 | A | 12/1996 | Clark et al. | 280/741 |
| 5,609,360 | A | 3/1997 | Faigle et al. | 280/740 |
| 5,611,566 | A | 3/1997 | Simon et al. | 280/736 |
| 5,613,703 | A | 3/1997 | Fischer | 280/741 |
| 5,622,380 | A | 4/1997 | Khandhadia et al. | 280/736 |
| 5,624,133 | A | 4/1997 | Wong | |
| 5,624,134 | A | 4/1997 | Iwai et al. | |
| 5,628,528 | A | 5/1997 | DeSautelle et al. | 280/736 |
| 5,630,619 | A | 5/1997 | Buchanan et al. | 280/741 |
| 5,662,722 | A | 9/1997 | Shiban | 55/413 |
| 5,702,494 | A | 12/1997 | Tompkins et al. | 55/498 |
| 5,725,245 | A | 3/1998 | O'Driscoll et al. | |
| 5,799,973 | A | 9/1998 | Bauer et al. | 280/741 |
| 5,813,695 | A | 9/1998 | O'Driscoll et al. | |
| 5,829,785 | A | 11/1998 | Jordan et al. | 280/741 |
| 5,845,935 | A | 12/1998 | Enders et al. | 280/743.2 |
| 5,860,672 | A | 1/1999 | Petersen | 280/728.2 |
| 5,872,329 | A | 2/1999 | Burns et al. | 149/36 |
| 5,934,705 | A * | 8/1999 | Siddiqui et al. | 280/736 |
| 5,941,562 | A | 8/1999 | Rink et al. | 280/741 |
| 5,970,880 | A | 10/1999 | Perotto | 102/531 |
| 6,019,389 | A | 2/2000 | Burgi et al. | 280/736 |
| 6,032,979 | A | 3/2000 | Mossi et al. | 280/741 |
| 6,074,502 | A | 6/2000 | Burns et al. | |
| 6,089,598 | A * | 7/2000 | Snyder et al. | 280/740 |
| 6,095,556 | A | 8/2000 | Bailey et al. | 280/737 |
| 6,095,559 | A | 8/2000 | Smith et al. | |
| 6,095,561 | A | 8/2000 | Siddiqui et al. | 280/472 |
| 6,106,000 | A | 8/2000 | Stewart | 280/728.2 |
| 6,116,491 | A | 9/2000 | Kutoh | 228/42 |
| 6,210,505 | B1 | 4/2001 | Khandhadia et al. | 149/36 |
| 6,244,623 | B1 | 6/2001 | Moore et al. | 280/471 |
| 6,379,627 | B1 | 4/2002 | Nguyen et al. | |
| 6,464,254 | B2 | 10/2002 | Chikaraishi et al. | 280/741 |
| 6,474,684 | B1 | 11/2002 | Ludwig et al. | |
| 6,485,051 | B1 | 11/2002 | Taguchi et al. | |
| 6,571,713 | B1 * | 6/2003 | Koga | 102/288 |
| 6,581,963 | B2 | 6/2003 | Mangun | 280/741 |
| 6,709,012 | B1 | 3/2004 | Tanaka et al. | |
| 6,764,096 | B2 | 7/2004 | Quioc | |
| 6,776,434 | B2 | 8/2004 | Ford et al. | 280/729 |
| 6,846,014 | B2 | 1/2005 | Rink et al. | 280/740 |
| 6,851,705 | B2 | 2/2005 | Young et al. | |
| 6,860,510 | B2 | 3/2005 | Ogawa et al. | 280/736 |
| 6,871,873 | B2 | 3/2005 | Quioc et al. | 280/741 |
| 6,908,104 | B2 | 6/2005 | Canterbery et al. | 280/736 |
| 6,929,284 | B1 | 8/2005 | Saso et al. | |
| 6,935,655 | B2 | 8/2005 | Longhurst et al. | 280/736 |
| 6,945,561 | B2 | 9/2005 | Nakashima et al. | |
| 6,948,737 | B2 | 9/2005 | Ohji et al. | |
| 6,976,702 | B2 | 12/2005 | Yakota et al. | 280/730.2 |
| 7,073,820 | B2 | 7/2006 | McCormick | 280/741 |
| 7,178,830 | B2 | 2/2007 | Blackburn | 280/736 |
| 7,237,801 | B2 | 7/2007 | Quioc et al. | 280/736 |
| 7,267,365 | B2 | 9/2007 | Quioc | 280/736 |
| 7,390,019 | B2 | 6/2008 | Gotoh et al. | 280/741 |
| 2002/0053789 | A1 | 5/2002 | Fujimoto | |
| 2003/0127840 | A1 | 7/2003 | Nakashima et al. | |
| 2003/0155757 | A1 | 8/2003 | Larsen et al. | |
| 2003/0201628 | A1 | 10/2003 | Choudhury et al. | 280/729 |
| 2004/0046373 | A1 | 3/2004 | Wang et al. | |
| 2005/0001414 | A1 | 1/2005 | Matsuda et al. | |
| 2005/0134031 | A1 | 6/2005 | McCormick | 280/741 |
| 2005/0161925 | A1 | 7/2005 | Blackburn | |
| 2005/0194772 | A1 | 9/2005 | Numoto et al. | |
| 2005/0230949 | A1 | 10/2005 | Blackburn | 280/736 |
| 2005/0263993 | A1 | 12/2005 | Blackburn | |
| 2005/0263994 | A1 | 12/2005 | Quioc | 280/741 |
| 2005/0280252 | A1 | 12/2005 | McCormick | |
| 2006/0005734 | A1 | 1/2006 | McCormick | |
| 2006/0043716 | A1 | 3/2006 | Quioc | |
| 2006/0082112 | A1 | 4/2006 | Blackburn | 280/736 |
| 2006/0273564 | A1 | 12/2006 | McCormick et al. | 280/740 |
| 2007/0001438 | A1 | 1/2007 | Patterson et al. | 280/740 |
| 2007/0095035 | A1 | 5/2007 | Quioc | 55/462 |
| 2008/0118408 | A1 | 5/2008 | Numoto et al. | 422/167 |

FOREIGN PATENT DOCUMENTS

| | | |
|---|---|---|
| EP | 0602785 B1 | 10/1993 |
| EP | 0728633 A1 | 2/1996 |
| EP | 0844149 A1 | 11/1997 |
| EP | 1122134 B1 | 7/2000 |
| EP | 1308353 A2 | 9/2002 |
| JP | 04055151 A | 2/1992 |
| JP | 05096147 | 4/1993 |
| JP | 05178155 A | 7/1993 |
| JP | 05178156 A | 7/1993 |
| JP | 06227358 A | 8/1994 |
| WO | WO 98/39183 | 9/1998 |
| WO | WO 2004/091982 A1 | 10/2004 |
| WO | WO 2005/035312 A2 | 4/2005 |
| WO | WO 2005/058645 A2 | 6/2005 |
| WO | WO 2005/086917 | 9/2005 |
| WO | WO 2006/044516 A2 | 4/2006 |
| WO | WO 2006/078819 A2 | 7/2006 |

OTHER PUBLICATIONS

U.S. Appl. No. 11/358,786.
Office Action for U.S. Appl. No. 11/140,055, filed May 27, 2005 dated for Apr. 20, 2007.
Office Action for U.S. Appl. No. 11/140,055, filed May 27, 2005 dated for Dec. 12, 2007.
Office Action for U.S. Appl. No. 11/167,849, filed Jun. 27, 2005 dated for Jan. 14, 2008.
Office Action for U.S. Appl. No. 11/445,859, filed Jun. 1, 2006 dated for Mar. 4, 2008.
Office Action U.S. Appl. No. 11/445,859, filed Jun. 1, 2006 dated for Sep. 18, 2008.
Office Action U.S. Appl. No. 11/479,494, filed Jun. 30, 2006 Dated for Nov. 12, 2008.
Office Action U.S. Appl. No. 11/167,849, filed Jun. 27, 2005 Dated for Oct. 17, 2008.

* cited by examiner

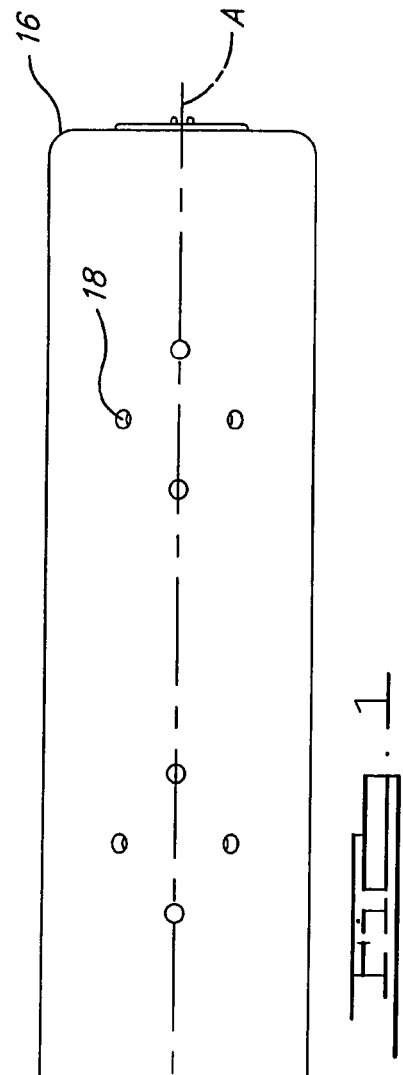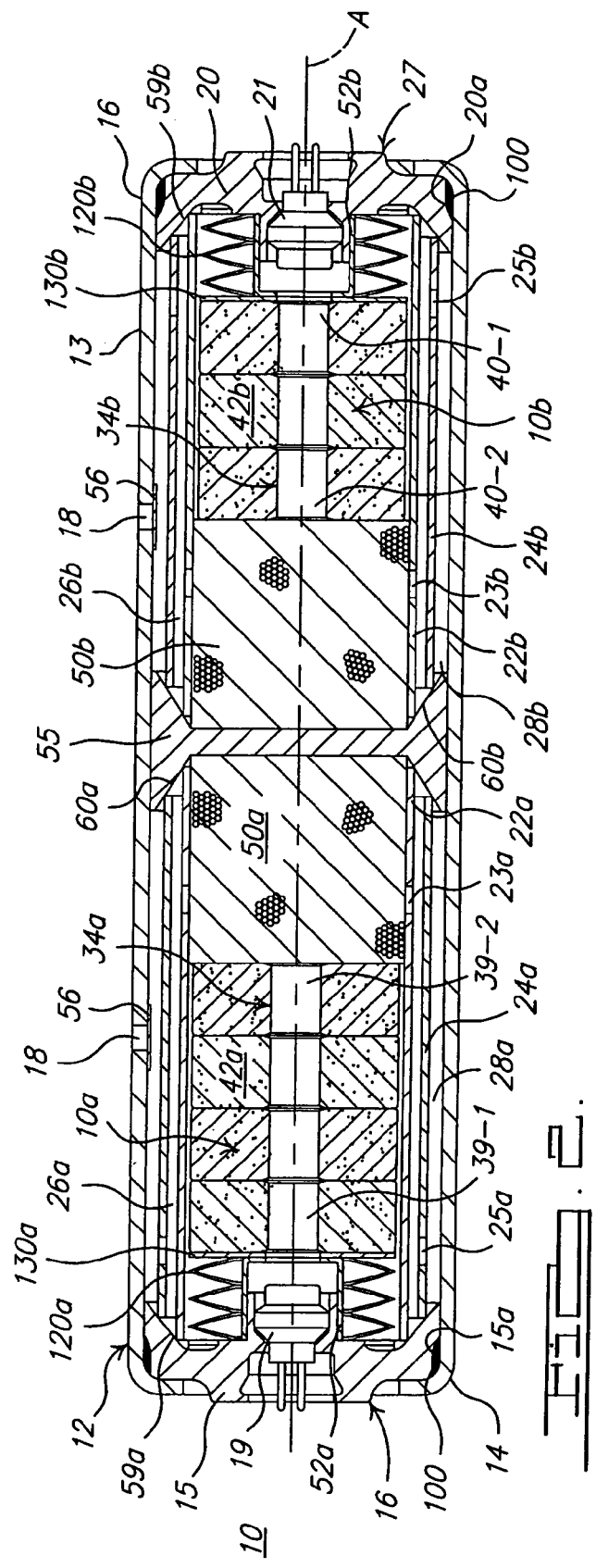

GAS GENERATING SYSTEM

CROSS REFERENCE TO RELATED APPLICATIONS

This application claims the benefit of provisional application Ser. No. 60/655,061 filed on Feb. 22, 2005.

BACKGROUND OF THE INVENTION

The present invention relates to gas generating systems and, more particularly, to a multi-stage gas generating system for use in a vehicle occupant protection system.

Some gas generating system designs incorporate one or more concentric, tubular baffles positioned within the gas generator housing to direct the flow of gases within the housing prior to expulsion of the gases from the housing. The baffles, usually in conjunction with an outer wall of the gas generator housing, form one or more concentric annular flow passages for channeling gas flow within the housing. In many of these designs, it is important to maintain the concentricity of the baffles during the flow of gases therethrough, to control the dimensions of the gas flow passages formed along the baffles. Concentricity of the baffles is usually achieved and maintained by the use of shoulders or tabs positioned along end portions of the housing to engage end portions of the baffles in interference fits. However, positioning the baffles to engage the shoulders or tabs during assembly of the gas generating system may be time consuming, thereby increasing assembly time and manufacturing costs.

SUMMARY OF THE INVENTION

A gas generating system is provided including a housing with a longitudinal axis, and a first baffle tube positioned within the housing and having a pair of opposed ends. A second baffle tube is also positioned within the housing and has a pair of opposed ends. A first pair of opposed surfaces is formed within the housing. Each of the first pair of opposed surfaces is sloped with respect to the longitudinal axis and abuts a corresponding end of the first baffle tube to position the first baffle tube within the housing such that a longitudinal axis of the first baffle tube is substantially coaxial with the longitudinal axis of the housing. Each of the first pair of opposed surfaces also abuts a corresponding end of the second baffle tube to position the second baffle tube within the housing such that a longitudinal axis of the second baffle tube is substantially coaxial with the longitudinal axis of the housing.

In another aspect of the invention, a gas generating system is provided including a housing having a longitudinal axis and a pair of opposed ends, and a bulkhead positioned between the housing ends for partitioning the housing into a first chamber and a second chamber isolated from the first chamber so as to prevent fluid communication with the first chamber. A first baffle tube is positioned within the first chamber. The first baffle tube has a pair of opposed ends. A first pair of opposed surfaces is formed within the first chamber. Each surface of the first pair of opposed surfaces is sloped with respect to the longitudinal axis and abuts a corresponding end of the first baffle tube to position the first baffle tube within the first chamber such that a longitudinal axis of the first baffle tube is substantially coaxial with the longitudinal axis of the housing. A second baffle tube is positioned within the second chamber. The second baffle tube has a pair of opposed ends. A second pair of opposed surfaces is formed within the second chamber. Each surface of the second pair of surfaces is sloped with respect to the longitudinal axis and abuts a corresponding end of the second baffle tube to position the second baffle tube within the second chamber such that a longitudinal axis of the second baffle tube is substantially coaxial with the longitudinal axis of the housing.

BRIEF DESCRIPTION OF THE DRAWINGS

FIG. 1 is a side view of a gas generating system in accordance with the present invention;

FIG. 2 is a cross-sectional side view of the gas generating system shown in FIG. 1.

DETAILED DESCRIPTION

Figure 3:
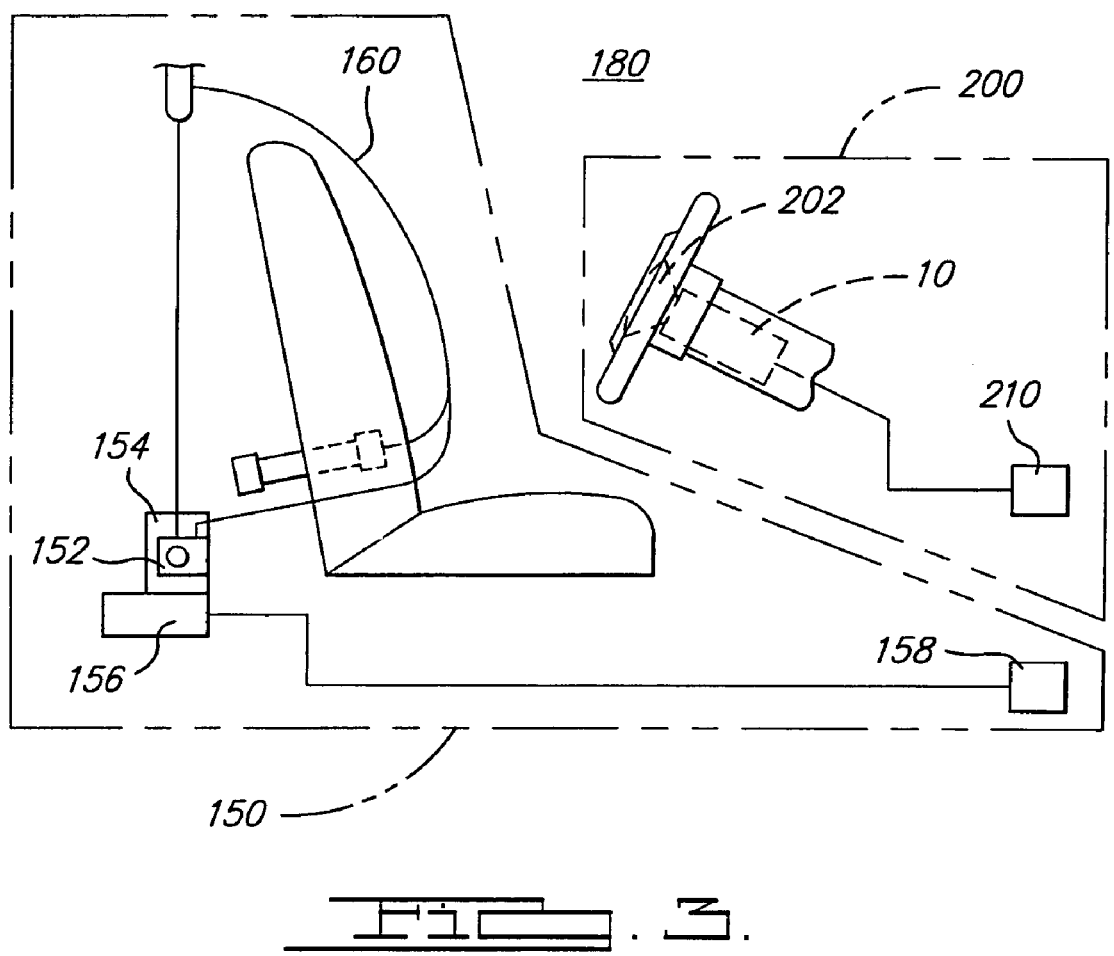
FIG. 3 is a schematic representation of an exemplary vehicle occupant protection system incorporating a gas generating system in accordance with the present invention.

FIGS. 1-2 show one embodiment of a gas generating system 10 in accordance with the present invention. Referring to FIGS. 1-2, gas generating system 10 includes an elongate, substantially cylindrical housing 12, such as is well known in the art. Housing 12 has a first end 14 and a second end 16. A plurality of gas discharge apertures 18 are spaced circumferentially along housing 12 to enable fluid communication between an interior of the housing and an exterior of the housing, the exterior of the housing being in fluid communication with an airbag (not shown) or other inflatable element of a vehicle occupant restraint system. Housing 12 also has a longitudinal central axis A, an outer wall 13, and openings formed at both ends of housing 12. The housing may be stamped, extruded, die cast, or otherwise metal formed and may be made from aluminum, low carbon steel, or any other metal/alloy that is not gas permeable and that does not fragment during the burning of the gas generant enclosed therein.

A bulkhead 55 divides the interior volume of housing 12 into two portions, a first combustion chamber 10a and a second combustion chamber 10b arranged in a side-by-side configuration. Bulkhead 55 prevents fluid communication between first chamber 10a and second chamber 10b. Bulkhead 55 may be formed from the same material as housing 12, or from another suitable material. Bulkhead 55 may be positioned within housing 12 and secured therein, for example, by crimps formed along housing 12 on either side of the bulkhead. The positioning of bulkhead 55 along the interior of housing 12 may be adjusted such that chambers 10a and 10b are of different sizes, enabling a different quantity of gas generant composition to be positioned in each chamber.

Bulkhead 55, along with filters 50a, 50b (described in greater detail below) prevent sympathetic ignition within the gas generating system. Sympathetic ignition is defined herein as the ignition of a gas generant in one of combustion chambers 10a, 10b by the burning of gas generant in the other one of combustion chambers 10a, 10b. Sympathetic ignition would occur, for example, when a gas generant 42a is deliberately ignited in combustion chamber 10a by a first igniter 19, and where the heat and energy associated with the burning of gas generant 42a ignites gas generant 42b in second combustion chamber 10b. Bulkhead 55 and filters 50a, 50b absorb the heat from the burning of gas generants 42a and 42b to prevent sympathetic ignition.

Each of chambers 10a and 10b has the same basic arrangement of gas generating system components; thus, in general, the following discussion of the components in one of the chambers also applies to the components in the other chamber.

Gas discharge apertures 18 may be covered with a foil 56 such as aluminum or stainless steel foil to prevent the incursion of water vapor into gas generating system housing 12. The foil 56, sometimes referred to as "burst foil" is typically of a thickness of from 0.01 to about 0.20 mm. The foil 56 is typically adhered to the interior surface of the housing 12 through the use of an adhesive.

A pair of substantially concentric baffle tubes 22a, 24a is positioned and secured within combustion chamber 10a, preferably centered about housing longitudinal axis A. Similarly, a pair of substantially concentric baffle tubes 22b, 24b is positioned and secured within combustion chamber 10b, also preferably centered about housing longitudinal axis A.

Baffle tubes 22a, 24a, 22b, 24b form, in conjunction with housing 12, a series of annular passages 26a, 28a, 26b, and 28b through which combustion gases propagate to discharge apertures 18 from interior portions of inner baffle tubes 22a, 22b. As is known in the art, baffle passages 26a, 28a, 26b, 28b are designed to cool the combustion products and to reduce or eliminate flaming of the combustion products prior to the products exiting the gas generating system through apertures 18. In alternative embodiments (not shown), more than two baffle tubes may be employed in one or more of combustion chambers 10a, 10b to further enhance cooling of the generated gases.

A plurality of gas discharge apertures 23a is spaced circumferentially around an end portion of inner baffle tube 22a to enable fluid communication between an interior of baffle tube 22a and an exterior of the baffle tube. Similarly, a plurality of gas discharge apertures 25a is spaced circumferentially around an end portion of outer baffle tube 24a to enable fluid communication between an interior of baffle tube 24a and an exterior of the baffle tube.

In addition, a plurality of gas discharge apertures 23b is spaced circumferentially around an end portion of inner baffle tube 22b to enable fluid communication between an interior of baffle tube 22b and an exterior of the baffle tube. Similarly, a plurality of gas discharge apertures 25b is spaced circumferentially around an end portion of outer baffle tube 24b to enable fluid communication between an interior of baffle tube 24b and an exterior of the baffle tube.

Endcaps 15, 20 are secured at respective first and second ends 14, 16 of housing 12 to seal the openings provided in the housing ends. End caps 15, 20 may be stamped, extruded, die cast, or otherwise metal formed and may be made from carbon steel or stainless steel, for example. End caps 15, 20 may be crimped, welded or clamped to housing 12 in a manner sufficient to ensure a gas tight seal between endcaps 15, 20 and housing 12, and in a manner sufficient to resist elevated internal housing pressures experienced during burning of the gas generant. In the embodiment shown in FIGS. 1-2, end portions of housing 12 are crimped over shoulders formed in end caps 15, 20.

A cavity may be formed in endcap 15 to accommodate an igniter 19 secured therein, thereby forming an igniter end cap assembly 16 as described below. Similarly, a cavity may be formed in endcap 20 to accommodate an igniter 21 secured therein, thereby forming an igniter end cap assembly 27 as described below.

Endcap 15 has an annular step portion 15a formed along an outer surface thereof for receiving a silicon sealing compound 100 therealong, as described in greater detail below. Similarly, endcap 20 has an annular step 20a portion formed along an outer surface thereof for receiving a silicon sealing compound 100 therealong. Step portions 15a and 20a are configured so as to provide a cavity between each of endcaps 15, 20 and housing 12 for receiving the silicon sealing compound 100 therein when the endcaps are crimped in position within housing 12.

Hermetic seals are formed between endcaps 15, 20 and housing 12 by using a two-part quick-cure silicon compound, generally designated 100. Silicone compound 100 forms a seal at each end of gas generating system 10 when end portions of housing 12 are crimped to secure endcaps 15, 20 in position. The silicone compound may include an additive causing it to fluoresce when exposed to an ultraviolet light. This enables a relatively low-cost vision system to be used during gas generating system assembly to inspect for the presence of the silicone prior to crimping of the housing to secure the endcaps. Silicone sealants as contemplated for use in the present invention are commercially available from, for example, Electro Insulation Corporation of Arlington Heights, Ill.

Referring again to FIG. 2, gas generating system 10 also includes first and second igniters 19, 21 for igniting the gas generant in respective ones of chambers 10a and 10b. Igniter 19 is secured to housing 12 such that the igniter is in communication with an interior of combustion chamber 10a and also with an exterior of the housing. Igniter 21 is secured to housing 12 such that the igniter is in communication with an interior of combustion chamber 10b and also with an exterior of the housing. In the embodiment shown, igniter 19 is incorporated into an igniter end cap assembly 16 that includes an igniter 19 and end cap 15. Similarly, igniter 21 is incorporated into an igniter end cap assembly 27 that includes an igniter 21 and end cap 20. Igniter end cap assemblies 16 and 27 are positioned along central axis A to seal openings provided in the end portions of housing 12. Igniters 19 and 21 may be formed as known in the art. One exemplary igniter construction is described in U.S. Pat. No. 6,009,809, herein incorporated by reference. Igniters 19 and 21 may be twisted or screwed into respective endcaps 15 and 20. Other contemplated means of attaching the igniters to their respective endcaps include crimping, welding, and the like.

Referring again to FIG. 2, in a first embodiment of the gas generating system, an elongated propagation tube 34a is provided for channeling combustion products formed by ignition of igniter 19 down the length of combustion chamber 10a, thereby facilitating longitudinal propagation of gas generant combustion toward bulkhead 55. Similarly, an elongated propagation tube 34b is provided for channeling combustion products formed by ignition of igniter 21 down the length of combustion chamber 10b, thereby facilitating longitudinal propagation of gas generant combustion toward bulkhead 55.

Propagation tube 34a has an elongate, substantially cylindrical body defining a first end 39-1, a second end 39-2, and an interior cavity. Propagation tube 34a also includes a plurality of apertures (not shown) spaced along a length thereof to enable fluid communication between igniter combustion products flowing along tube 34a and a quantity of gas generant composition 42a positioned in combustion chamber 10a alongside tube 34a.

Propagation tube 34b also has an elongate, substantially cylindrical body defining a first end 40-1, a second end 40-2, and an interior cavity. Propagation tube 34b also includes a plurality of apertures (not shown) spaced along a length thereof to enable fluid communication between igniter combustion products flowing along tube 34b and a quantity of gas generant composition 42b positioned in combustion chamber 10b alongside tube 34b.

Propagation tubes 34a, 34b may be roll formed from sheet metal and then perforated. Propagation tubes 34a and 34b are preferably positioned within housing 12 to extend along central axis A of the housing. First end 39-1 of tube 34a is positioned to enable fluid communication between igniter 19 and the interior cavity of tube 34a. First end 40-1 of tube 34b is positioned to enable fluid communication between igniter 21 and the interior cavity of tube 34b. The elongate shapes of tubes 34a and 34b provide for combustion of gas generants 42a and 42b that propagates substantially from respective tube first ends 39-1, 40-1 toward respective tube second ends 39-2. 40-2. In an alternative embodiment (not shown), tubes 34a and 34b are omitted from the gas generating system.

Referring again to FIG. 2, a cup 52a coupled to propagation tube 34a may enclose igniter 19 to define a fluid-tight interior portion of the cup in communication with the interior cavity of tube 34a and igniter 19. In addition, a cup 52b coupled to propagation tube 34b may enclose igniter 21 to define a fluid-tight interior portion of the cup in communication with the interior cavity of tube 34b and igniter 21.

Cups 52a and 52b are positioned proximate respective propagation tube first ends 39-1 and 40-1. During activation of gas generating system 10, cups 52a and 52b can each accommodate a resident interim gas pressure, facilitating ignition of respective gas generants 42a and 42b. A quantity of booster propellant (not shown) may also be positioned in the interior portions of any of cups 52a and 52b to facilitate combustion of respective gas generants 42a and 42b, in a manner known in the art. Cups 52a and 52b may be formed integral with respective propagation tubes 34a and 34b, and may be stamped, extruded, die cast, or otherwise metal formed and may be made from carbon steel or stainless steel, for example. Alternatively, cups 52a and 52b may be formed separately from tubes 34a and 34b, then attached to respective ones of tubes 34a and 34b (for example, by welding or adhesive attachment) prior to assembly of the gas generating system.

Suitable gas generant compositions are disclosed, for example, in Applicant's co-pending U.S. patent application Ser. No. 09/664,130, incorporated herein by reference. Also, other gas generants that should be incorporated by reference in the application include, but are not limited to, those described in U.S. Pat. Nos. 5,035,757, 6,210,505, and 5,872, 329, also incorporated herein by reference. In the embodiment shown in FIG. 2, gas generant 42a is in the form of a plurality of annular wafers stacked along tube 34a to substantially enclose tube 34a along a portion of its length. Similarly, gas generant 42b is in the form of a plurality of annular wafers stacked along tube 34b to substantially enclose tube 34b along a portion of its length. Each of the gas generant wafers has a cavity formed therein for receiving a portion of a corresponding propagation tube therethrough, if desired.

It will be appreciated that other, alternative arrangements of the gas generant composition may be used. For example, either (or both) of combustion chambers 10a and 10b may be partially or completely filled with a gas generant in granulated or tablet form. In addition, as stated previously, the position of bulkhead 55 may be adjusted to permit different amounts of gas generant to be positioned in chambers 10a and 10b, thereby enabling the inflation profile to be tailored according to design requirements.

Referring again to FIG. 2, one or more spring members 120a are positioned intermediate endcap 15 and gas generant 42a for exerting a force on the gas generant to maintain the wafers or tablets comprising the gas generant in contact with each other. Force is applied by spring members 120a through an endplate 130a movable along cup 52a to press against gas generant 42a. Similarly, one or more spring members 120b are positioned intermediate endcap 20 and gas generant 42b for exerting a force on the gas generant to maintain the wafers or tablets comprising the gas generant in contact with each other. Force is applied by spring members 120b through an endplate 130b movable along cup 52b to press against gas generant 42b. Spring members 120a and 120b and endplates 130a and 130b may be formed from steel or other suitable metal alloys.

A filter 50a is incorporated into the gas generating system design for filtering particulates from gases generated by combustion of gas generant 42a. The filter also acts as a heat sink to reduce the temperature of the hot inflation gas. In general, filter 50a is positioned at an end of combustion chamber 10a, proximate bulkhead 55 and aligned with apertures 23a of inner baffle 22a to help ensure that inflation gas passes through the filter before exiting inner baffle 22a. Similarly, a filter 50b may be incorporated into the gas generating system design for filtering particulates from gases generated by combustion of gas generant 42b. The filter also acts as a heat sink to reduce the temperature of the hot inflation gas. In general, filter 50a is positioned at an end of combustion chamber 10b, proximate bulkhead 55 and aligned with apertures 23b of inner baffle 22b to help ensure that inflation gas passes through the filter before exiting inner baffle 22b. Filters 50a and 50b are preferably formed from compressed knitted metal wire which is commercially available from vendors such as Metex Corp. of Edison, N.J. Alternative filter compositions and structures (not shown) are also contemplated.

In accordance with the present invention, a baffle alignment mechanism is provided for maintaining the centering and relative spacing of baffle tubes 22a, 22b, 24a, and 24b. Referring to FIG. 2, in one embodiment the baffle alignment mechanism comprises an annular chamfer 59a formed along an interior surface of end cap 15 and similar annular chamfer 60a formed along an edge portion of bulkhead 55 in opposition to chamfer 59a. Chamfers 59a and 60a perform the function of centering baffle tubes 22a and 24a within housing 12. Specifically, as end cap 15 is moved toward bulkhead 55, opposite edges of baffle tubes 22a and 24a slide along chamfered surfaces 59a and 60a until an equilibrium position along surfaces 59a and 60a is reached by the edges of each baffle tube (that is, until further movement of end cap 15 toward bulkhead 55 is prohibited.) Similarly, chamfered portions 59a and 60a act to position outer baffle tube 24a with respect to outer wall 13 of housing 12. At this point, the radial spacing between inner baffle tube 22a and outer baffle tube 24a is substantially constant along the length of annular passage 26a. In addition, the radial spacing between outer baffle tube 24a and housing outer wall 13 is substantially constant along the extent of annular passage 28a. An end portion of housing 12 is then crimped over end cap 15 to maintain the baffle tubes in their centered positions. In this respect, chamfered portions 59a and 60a act to center and maintain baffle tubes 22a and 24a within housing 12 and with respect to each other prior to and during activation of gas generating system 10.

Similarly, an annular chamfer 59b is formed along an interior surface of end cap 20 and similar annular chamfer 60b formed along an edge portion of bulkhead 55 in opposition to chamfer 59b. Chamfers 59b and 60b perform the function of centering baffle tubes 22b and 24b within housing 12. Specifically, as end cap 20 is moved toward bulkhead 55, opposite edges of baffle tubes 22b and 24b slide along chamfered surfaces 59b and 60b until an equilibrium position along surfaces 59b and 60b is reached by the edges of each baffle tube (that is, until further movement of end cap 20 toward bulkhead 55 is prohibited.) Similarly, chamfered portions 59b and 60b act to position outer baffle tube 24b with respect to outer wall 13 of housing 12. At this point, the radial spacing between inner baffle tube 22b and outer baffle tube 24b is substantially constant along the length of annular passage 26b. In addition, the radial spacing between outer baffle tube 24b and housing outer wall 13 is substantially constant along the extent of annular passage 28b. An end portion of housing 12 is then crimped over end cap 20 to maintain the baffle tubes in their centered positions. In this respect, chamfered portions 59b and 60b act to center and maintain baffle tubes 22b and 24b within housing 12 and with respect to each other prior to and during activation of gas generating system 10.

Operation of the gas generating system will now be discussed.

Either of igniters 19 and 21 may be ignited individually to produce combustion of respective gas generants 52a or 52b. Alternatively, both of igniters 19 and 21 may be activated simultaneously or in sequence, depending on the inflation profile required of the gas generating system.

When combustion chamber 10a is to be activated, upon receipt of a signal from a crash sensor, an electrical activation signal is sent to igniter 19, thereby activating the igniter. Cup 52a channels a flow of combustion products from the igniter to propagation tube first end 39-1. As igniter combustion products progress from tube first end 39-1 toward tube second end 39-2, gas exit apertures in tube 39 facilitate expulsion of combustion gases into combustion chamber 10a, thereby igniting gas generant 42a. Gas generant combustion products proceed toward bulkhead 55, passing through filter 50a and out of baffle tube apertures 23a, entering annular passage 26a formed between baffle tubes 22a and 24a. The combustion products then proceed down the length of baffle tube 22a, exiting tube 22a at apertures 25a formed in baffle tube 24a. The combustion products then flow along the length of baffle tube 24a, exiting housing 12 through housing apertures 18.

When combustion chamber 10b is to be activated, upon receipt of a signal from a crash sensor, an electrical activation signal is sent to igniter 21, thereby activating the igniter. Cup 52b channels a flow of combustion products from the igniter to propagation tube first end 40-1. As igniter combustion products progress from tube first end 40-1 toward tube second end 40-2, gas exit apertures in tube 40 facilitate expulsion of combustion gases into combustion chamber 10b, thereby igniting gas generant 42b. Gas generant combustion products proceed toward bulkhead 55, passing through filter 50b and out of baffle tube apertures 23b, entering annular passage 26b formed between baffle tubes 22b and 24b. The combustion products then proceed down the length of baffle tube 22b, exiting tube 22b at apertures 25b formed in baffle tube 24b. The combustion products then flow along the length of baffle tube 24b, exiting housing 12 through housing apertures 18.

Several advantages may be realized from use of a gas generating system incorporating the features described herein. Due to the existence of two independent combustion chambers in gas generating system 10, the gas generating system can be tuned to release an optimal amount of inflation gas during a crash event. In addition, since the design of gas generating system 10 does not permit sympathetic ignition, gas generant 42a in the first combustion chamber 10a will only ignite if first igniter 19 is fired. Similarly, gas generant 42b in second combustion chamber 10b will only ignite if second igniter 21 is fired.

Also, it may be seen from the above description that the arrangement of chamfers 59a and 59b formed along end caps 15 and 20, and chamfers 60a and 60b formed along bulkhead 55 help to ensure that the desired centering and spacing of baffle tubes 22a, 22b, 24a, and 24b are maintained during operation of the gas generating system in applications where the annular gap separating the baffle tubes is critical to system gas flow and proper operation of the gas generating system.

Furthermore, the provision of tortuous inflation gas exit paths (through use of baffle tubes 22a, 22b, 24a, and 24b) produces an increase in residence time of inflation gas within the gas generating system. This increase in residence time results in more complete combustion of the gas generant with a corresponding reduction in effluents and a reduction in flaming of the combustion products during gas generating system deployment.

In addition, the use of the baffle tubes also provides a flatter ballistic curve over the span of deployment due to lower gas temperatures resulting from adiabatic cooling of the inflation gases as the gases expand while flowing through and along the baffles. There is also a smaller drop in airbag pressure due to cooling of the inflation gas while inside the airbag. These features may be beneficial in instances where the airbag needs to inflate and/or remain inflated over a longer time period (for example, in rollover applications).

Also, existing gas generating system designs, which use one or more O-rings to provide seals between the endcaps and the housing, may be subject to leaking due to bulging of the gas generating system body during crimping. These designs also require a smooth surface finish on the inner surface of the housing to ensure a good O-ring seal. The incorporation of a two-part quick-cure silicone as described herein provides an improved hermetic seal while obviating the stringent housing surface finish requirements.

Furthermore, assembly of the gas generating system is simplified by use of the two-part quick-cure silicone with a fluorescent additive and the baffle tube alignment mechanism disclosed herein, thereby reducing assembly costs.

Finally, use of the baffle tubes to channel and cool the inflation gases rather than a conventional expanded metal/mesh filter also reduces the weight and component costs of the gas generating system.

Referring to FIG. 3, in a particular application, a gas generating system including an embodiment of the baffle alignment mechanism described above is incorporated into an airbag system 200. Airbag system 200 includes at least one airbag 202 and a gas generating system 10 as described herein coupled to the airbag so as to enable fluid communication with an interior of the airbag upon activation of the gas generating system. Airbag system 200 may also be in communication with a known crash event sensor 210 that is in operative communication with a crash sensor algorithm (not shown) which signals actuation of airbag system 200 via, for example, activation of either of (or both of) igniters 19 and 21 (not shown in FIG. 3) in the event of a collision.

Referring again to FIG. 3, an embodiment of the gas generating system or an airbag system including an embodiment of the gas generating system may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
 a housing having a longitudinal axis and a pair of opposed ends;
 a bulkhead positioned between the housing ends for partitioning the housing into a first chamber and a second chamber isolated from the first chamber so as to prevent fluid communication with the first chamber;
 a first baffle tube positioned within the first chamber, the first baffle tube having a pair of opposed ends;
 a first pair of opposed surfaces formed within the first chamber, each surface of the first pair of surfaces being sloped with respect to the housing longitudinal axis and abutting a corresponding end of the first baffle tube to position the first baffle tube within the first chamber such that a longitudinal axis of the first baffle tube is substantially coaxial with the longitudinal axis of the housing;
 a second baffle tube positioned within the second chamber, the second baffle tube having a pair of opposed ends; and
 a second pair of opposed surfaces formed within the second chamber, each surface of the second pair of surfaces being sloped with respect to the housing longitudinal axis and abutting a corresponding end of the second baffle tube to position the second baffle tube within the second chamber such that a longitudinal axis of the second baffle tube is substantially coaxial with the longitudinal axis of the housing.

2. The gas generating system of claim 1 further comprising an endcap for sealing an end of the housing, and wherein one surface of the first pair of surfaces is formed along the endcap and another surface of the first pair of surfaces is formed along the bulkhead.

3. The gas generating system of claim 1 further comprising a third baffle tube positioned within the first chamber, the third baffle tube having a pair of opposed ends, and wherein each surface of the first pair of surfaces abuts a corresponding end of the third baffle tube to position the third baffle tube within the first chamber such that a longitudinal axis of the third baffle tube is substantially coaxial with the longitudinal axis of the housing.

4. The gas generating system of claim 3 further comprising a fourth baffle tube positioned within the second chamber, the fourth baffle tube having a pair of opposed ends, and wherein each surface of the second pair of surfaces abuts a corresponding end of the fourth baffle tube to position the fourth baffle tube within the second chamber such that a longitudinal axis of the fourth baffle tube is substantially coaxial with the longitudinal axis of the housing.

5. A vehicle occupant protection system including a gas generating system according to claim 1.

* * * * *